Figure 1:
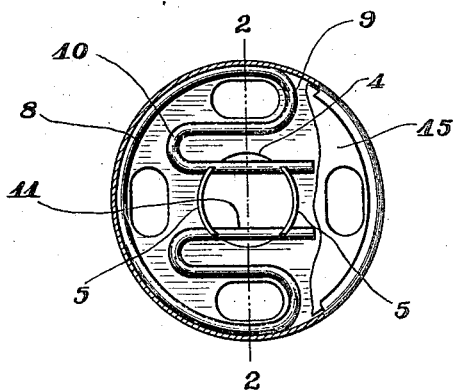

G. R. UPHAM.
SOCKET MEMBER FOR SNAP FASTENERS.
APPLICATION FILED JULY 27, 1921.

1,407,687.

Patented Feb. 21, 1922.

Inventor
Gilbert R. Upham
By Cyrus N. Anderson
Attorney

UNITED STATES PATENT OFFICE.

GILBERT R. UPHAM, OF PHILADELPHIA, PENNSYLVANIA, ASSIGNOR TO THE DE LONG HOOK AND EYE COMPANY, OF PHILADELPHIA, PENNSYLVANIA, A CORPORATION OF PENNSYLVANIA.

SOCKET MEMBER FOR SNAP FASTENERS.

1,407,687.  Specification of Letters Patent.  Patented Feb. 21, 1922.

Application filed July 27, 1921. Serial No. 487,881.

*To all whom it may concern:*

Be it known that I, GILBERT R. UPHAM, a citizen of the United States, and a resident of Philadelphia, in the county of Philadelphia and State of Pennsylvania, have invented an Improvement in Socket Members for Snap Fasteners, of which the following is a specification.

My invention relates to the socket members of snap fasteners in which springs are employed for engaging the heads or studs of the stud members and in which the socket members are of a character such that either side of the respective socket members may be regarded as the top side and in which the stud or head of a stud member may be inserted from either side.

In order that snap fasteners may in use prove entirely satisfactory it is desirable that the portions of the spring forming a part of the socket member which are adapted to engage the head or stud of a stud member shall be supported and retained in exact and desired relation or position with respect to the socket opening of the socket member.

Therefore it is one of the objects of the invention to provide the socket members of snap fasteners with means for positively retaining the portions of the wire springs thereof which are adapted to engage the heads of stud members in predetermined, accurate relation to the sockets of said socket members.

In order that the invention may be readily understood and its practical advantages fully appreciated, reference should be had to the accompanying drawing in which I have illustrated one form of a convenient embodiment of my invention. However, it will be understood that changes in the details of construction may be made within the scope of the claim without departing from the invention.

Figure 2:
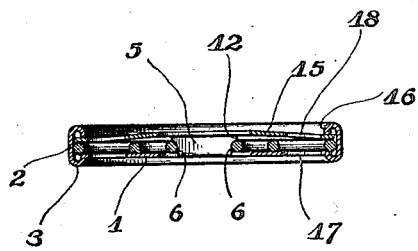

In the drawing:

Fig. 1 is a view partly in plan and partly in section of a socket member of a snap fastener embodying the invention, the section being taken in a plane substantially parallel with the opposite faces or sides of the said member; and Fig. 2 is a transverse sectional view taken on the line 2—2 of Fig. 1.

Referring to the drawing: 1 designates a disk of relatively flat plate metal which is provided at its outer edge with a flange-like portion 2 which is arranged substantially at right angles to the plate 1. The flange 2 is connected to the edge of the plate 1 by a bead-like portion 3 the presence of which strengthens and stiffens the finished socket member. The plate 1 is provided at its center with a circular opening 4. 5 designates flange-like projections which extend laterally from the edge of the socket 4. These projections 5 are situated in diametrically opposed relation with respect to each other. The opposite edges of each of the said portions are notched or undercut as indicated at 6 in the drawing. For the purpose of retaining the head of a stud member in engagement with the socket member I have provided a wire spring comprising the substantially semi-circular portion 8 which is seated against a portion of the flange 2, as is clearly shown in the drawing. The opposite end portions of this spring are bent inwardly as indicated at 9 and are extended reversely or backwardly toward the semi-circular portion 8 and are again bent inwardly as indicated at 10, and the extreme opposite end portions of the spring are extended forwardly and in parallel relation to each other, as indicated at 11. These portions 11 of the spring overlie diametrically opposed portions of the socket opening 4 of the socket member, as is clearly shown in Fig. 1. The portions 11 of the retaining spring contact with the opposite edges of the flange projections 5 and are seated within the notches or undercut portions 6 thereof. The outwardly and oppositely projecting portions 12 at the opposite upper edges of the flange-like portions 5 partially overlie the portions 11 of the wire spring so that the latter is securely held in position prior to the time that the cover plate 15 is placed thereover. The said cover plate is held or retained in position by means of the inwardly and downwardly turned edges 16 of the flange portions 2.

It will be noted that the height of the flange projections 5 is greater than the thickness of the retaining wire spring and that in consequence the central portion of the said plate is prevented from being clamped against the retaining wire spring. As a result the spring is permitted to flex freely between the plates 1 and 15. Thread openings 17 and 18 are provided at intervals in the respective plates 1 and 15. These openings are placed in registry with each other, as indicated, so that the socket members may be secured in place upon an article of wearing apparel or an article of other character by threads which pass or extend through the said openings.

Having thus described my invention, what I claim and desire to secure by Letters Patent is:

The socket member of a snap fastener, comprising a disk-like metal plate member having a flange at its outer edge and a central socket opening and having oppositely disposed flanges surrounding portions of said opening, said flanges projecting laterally from said plate member and being provided with notches in the opposite edges thereof, a spring seated against the inner face of said plate member, said spring being provided with parallel portions which are adapted to overlie portions of said opening, the said parallel portions of said spring being situated within the said notches and contacting with the opposite edges of the said last mentioned flanges, and a cover plate extending over the said spring and the said projections and being retained by overturning the edge portions of the first mentioned flange.

In testimony that I claim the foregoing as my invention, I have hereunto subscribed my name this 23rd day of July, 1921.

GILBERT R. UPHAM.